United States Patent [19]
Ayers

[11] 4,143,369
[45] Mar. 6, 1979

[54] IFF DIVERSITY SWITCH

[75] Inventor: Herman W. Ayers, Torrance, Calif.

[73] Assignee: Northrop Corporation, Los Angeles, Calif.

[21] Appl. No.: 844,729

[22] Filed: Oct. 25, 1977

[51] Int. Cl.² ............................ G01S 9/56; H01Q 3/24
[52] U.S. Cl. .................................. 343/6.5 R; 307/41;
        325/370; 328/137; 328/154; 343/6.5 LC;
        343/6.8 R; 343/6.8 LC; 343/876
[58] Field of Search ........... 343/6.5 R, 6.5 LC, 6.8 R,
        343/6.8 LC, 876; 328/154, 137; 325/370, 366;
        307/41

[56] References Cited

U.S. PATENT DOCUMENTS

| 2,901,743 | 8/1959 | Jacobsen et al. | 328/154 |
| 2,937,268 | 5/1960 | Downie et al. | 325/370 |
| 3,037,114 | 5/1962 | Bier et al. | 325/370 |
| 3,182,263 | 5/1965 | Gossard | 325/370 |
| 3,643,256 | 2/1972 | Owen | 343/6.5 R |
| 3,670,275 | 6/1972 | Kalliomaki et al. | 325/370 |
| 3,710,382 | 1/1973 | Allen | 343/876 |
| 4,041,397 | 8/1977 | Bauer et al. | 325/370 |

Primary Examiner—S. C. Buczinski
Attorney, Agent, or Firm—William W. Rundle; Willard M. Graham

[57] ABSTRACT

An antenna diversity switch for IFF radar equipment not having such a switch incorporated in it. This new diversity switch requires no modification of the existing IFF components. The blanking pulses generated by the IFF system when an interrogating signal is received are used to trigger a monostable multivibrator which stops a free-running flip-flop controlling the switching between two antennas so that the antenna connected at that time remains connected. When the blanking pulses stop, i.e., the interrogating signal is too weak to be received, the monostable multivibrator is returned to its untriggered condition which allows the flip-flop and its controlled antenna switch to resume switching between the antennas. Suitable timing controls are provided to switch antennas at the desired rate and to keep the diversity switch connected to a receiving antenna for a desired delay time after the received interrogating signal ceases. The present diversity switch is wired physically into the IFF system by means of an electrical tee connection simply made in the existing cable line from the IFF system to an antenna switch.

9 Claims, 10 Drawing Figures

IFF DIVERSITY SWITCH

BACKGROUND OF THE INVENTION

1. Field of the Invention

The invention herein described was made in the course of U.S. Air Force Contract No. F33657-70-C-0717.

The present invention relates to a two-antenna IFF radio or radar system, and more particularly, to a diversity switch for providing antenna diversity capability.

2. Description of the Prior Art

In a vehicle having an IFF system which automatically responds to an interrogating signal transmitted from radar in the vicinity, two separately located antennas are frequently carried by the vehicle. It is common to have an antenna switch so that either of the two antennas alone can be connected to the vehicle receiver. Some new IFF systems include a diversity switch switching back and forth between the two antennas in the absence of a received interrogating signal, and automatic means for stopping the diversity switch at one antenna position when a signal is received by that antenna. However, the received signal must have at least a predetermined power level in dB to cause the diversity switch to stop on that one antenna. The IFF system may have a manual antenna selector switch so the operator can switch from automatic to either antenna as long as the manual switch is so positioned.

Another known type of diversity switching is disclosed in U.S. Pat. No. 3,037,114, for a different application. It is used to switch antennas of a radio having an audio output the magnitude of which is used to control a multivibrator circuit between a relatively slow free-running state and a bistable state.

It is an object of the present invention to provide a simple diversity switch which can be added to an IFF system to connect the one of two antennas which is receiving the desired signal, without modifying any of the existing IFF components.

A further object of the present invention is to provide such a diversity switch as in the preceding paragraph without having to design a new receiver and transmitter to detect the magnitude of the incoming interrogating signal in order to control the diversity switch action.

Another object of this invention is to provide an IFF system diversity switch control which is initiated by or at the same time as the reply of the IFF system to an external interrogating signal.

The transponder in an IFF system automatically generates a blanking or reply pulse or pulses simultaneously with its reply to an interrogation signal, which blanking pulses are used to inform certain other electronic sections to neglect the IFF signals and do not react to them; and a further object of this invention is to use the blanking pulses as the source of command or control of the diversity switch operating circuits.

The conventional antenna switch itself as now in use may be a type using a positive voltage source, with respect to ground, or a type using a negative voltage source. It is still another object of the present invention to provide a diversity switch system which can be used with either type of antenna switch, so that one type of antenna switch can be replaced by the other type with no changes whatsoever to the diversity switch system.

SUMMARY OF THE INVENTION

Briefly, my invention comprises a diversity switch circuit having a signal input adapted to be connected to the blanking or reply pulses of a vehicle IFF system and an output adapted to be connected to an antenna switch for switching the input of the IFF system between either of two antennas. A flip-flop or the like has two complementary output points connected (through respective driving means if needed) to the two control inputs of the antenna switch. A flip-flop control means is provided to receive the blanking pulses. An output of the control means has two states, depending respectively on the presence or absence of a desired number of sequential blanking pulses at its input. This control means output is connected to the flip-flop input so that in one state of the control output, the flip-flop is a free-running multivibrator and in the other control output state the flip-flop is held stable at one of its two states, the held state being that one in which the antenna picking up an interrogating signal is connected at that time to the IFF system.

In a preferred embodiment, the flip-flop control means comprises a monostable multivibrator which remains triggered "on" as long as blanking pulses are being received but will return to "off" when at least two successive blanking pulses are absent.

For precise timing, an adjustable clock pulse generator is preferred to be incorporated, the clock pulses doing the actual triggering of the flip-flop when required. In this event the flip-flop can be a J-K type with a clock input trigger point, for example.

When a manual antenna selector switch is to be provided, my invention also includes the necessary antenna switch control means to "logic" to have the manual selector switch override the diversity switch action. This logic has dual output circuitry connected in parallel for accommodating either polarity of power supply in the antenna switch. The dual circuitry includes diode means which are automatically reverse biased by one power supply polarity and therefore has no effect on the operation.

BRIEF DESCRIPTION OF DRAWINGS

The invention will be more fully understood by reference to the detailed description of specific apparatus to follow, and to the accompanying illustrative drawings, wherein.

DESCRIPTION OF PREFERRED EMBODIMENT

Figure 1:
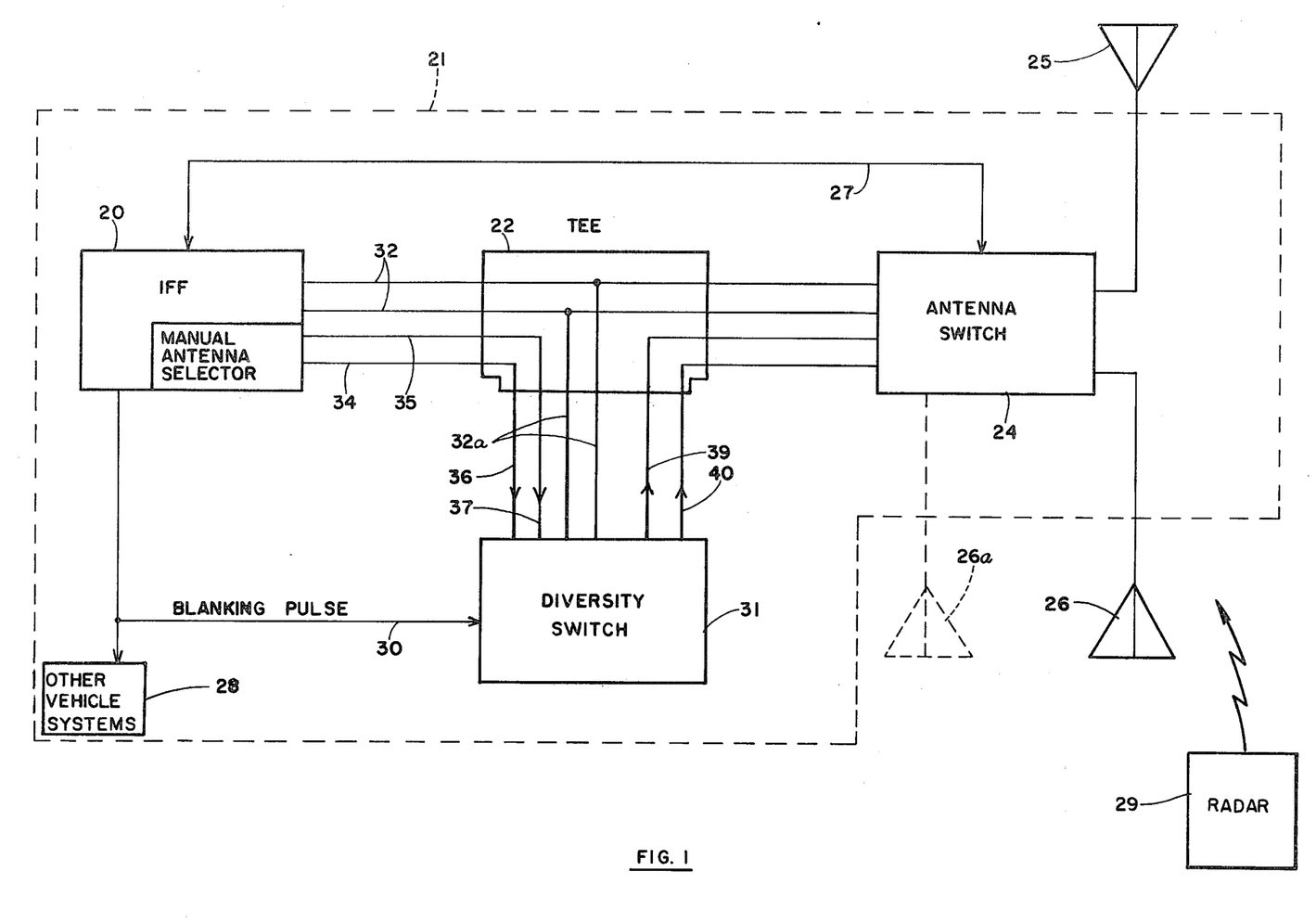
FIG. 1 is a block diagram showing a two-antenna IFF system having the present diversity switch connected therein.

Referring first to FIG. 1, an IFF system transponder 20 in a vehicle body 21 such as an aircraft, for example, is connected by wiring through a tee fitting 22 to an antenna switch 24 (preferably solid-state) which can switch reception of the IFF set from either of two antennas 25 and 26. An antenna signal output line 27 leads from antenna switch 24 to the IFF 20. Although shown separately in FIG. 1, the antenna output line 27 might be included with the other wiring through tee 22, such as in a single multiple-wire cable. The IFF is built to respond to certain radar signals from any friendly interrogating radar system 29 that appears in the vicinity, as is customary. During this response, IFF 20 generates a blanking pulse or train of blanking pulses for use in other vehicle systems 28, which is also conventional, and in this invention a blanking pulse line 30 carries such blanking pulses from the IFF to a diversity switch 31 of the present invention.

Other wiring from the IFF 20 comprises two power supply lines 32 to the antenna switch 24 and two manual antenna selector leads 34 and 35 used to manually set the antenna switch 24 fixed in either of its two positions if desired. The diversity switch 31 is connected into the total IFF system through the tee 22, without modifying any of the IFF components with the exception of merely bringing out the blanking pulse line 30. Branch power supply lines 32a to the diversity switch 31 are tapped to the supply leads 32 in the tee 22. The connections of the manual selector leads 34 and 35 to the antenna switch 24 are broken in tee 22 to form two manual antenna selector input leads 36 and 37 into the diversity switch 31, and two antenna selector output leads 39 and 40 are provided from diversity switch 31 to the tee 22 to proceed from there to control the antenna switch 24 at its regular input connections.

Figure 2:
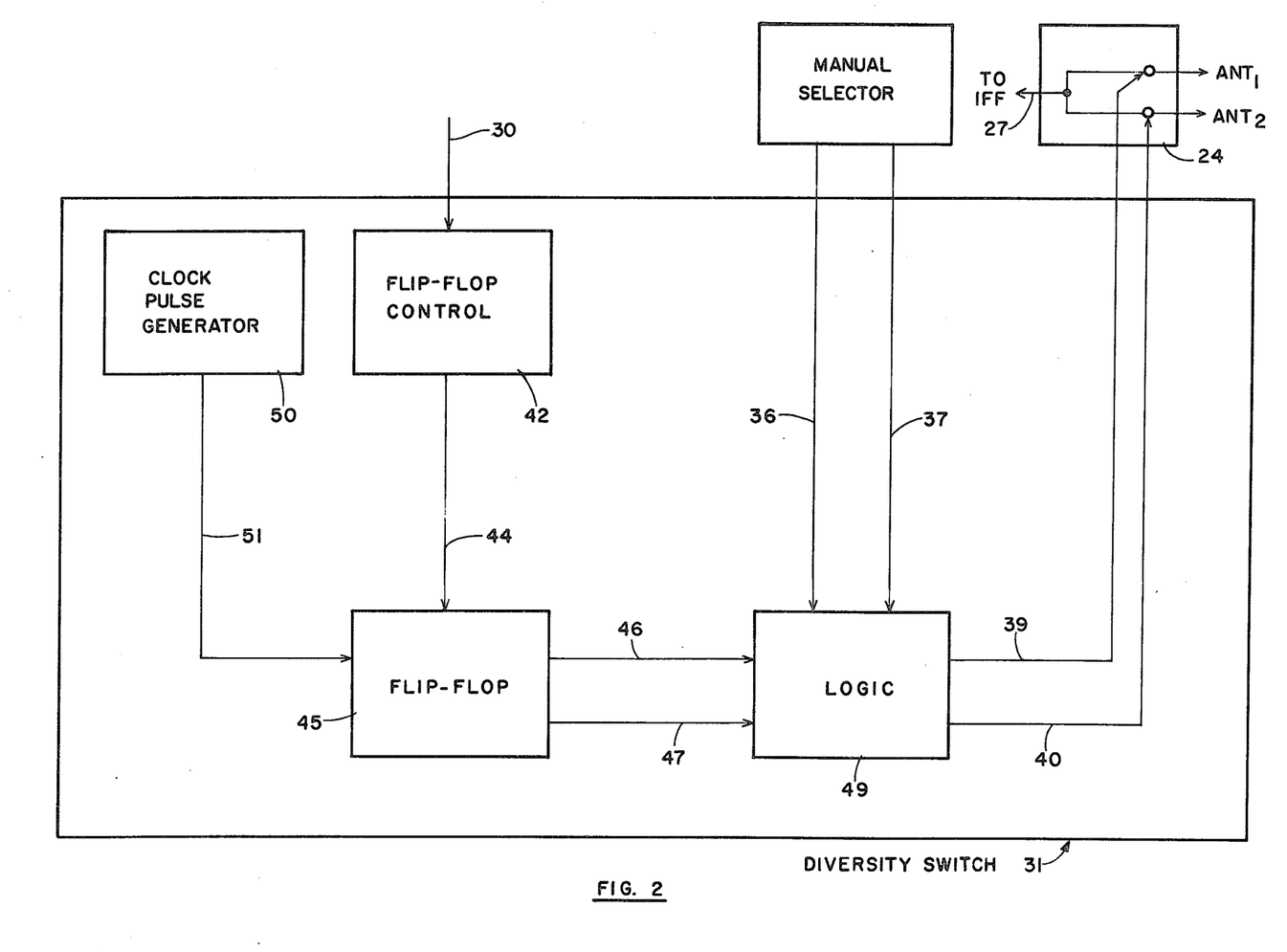
FIG. 2 is a block diagram showing the components of the diversity switch.

FIG. 2 shows the general components of the present diversity switch 31. The branch power supply lines 32a of FIG. 1 (not shown in FIG. 2) feed into the diversity switch 31 where they are connected to points not shown but readily understood to be the required operating voltage supply and return points for the various circuits. A flip-flop control means 42 has the blanking pulse line 30 connected to its input, and a flip-flop control line 44 connects the output of control means 42 to the control input or inputs of a flip-flop 45. The complementary output states of flip-flop 45 are connected by a Q line 46 and a $\bar{Q}$ line 47 respectively to logic circuit means 49, when the latter circuit is required. The manual antenna selector input leads 36 and 37 are also connected to logic circuit 49, and the antenna selector output leads 39 and 40 are connected to the output of logic circuit 49.

The present flip-flop 45 may be a J-K type wherein input information is transferred to the outputs upon the occurrence of the positive-going edge of a square-wave clock pulse. Therefore, a clock pulse generator 50 is provided, with a clock pulse line 51 going to the clock input of the flip-flop 45.

Figure 3:
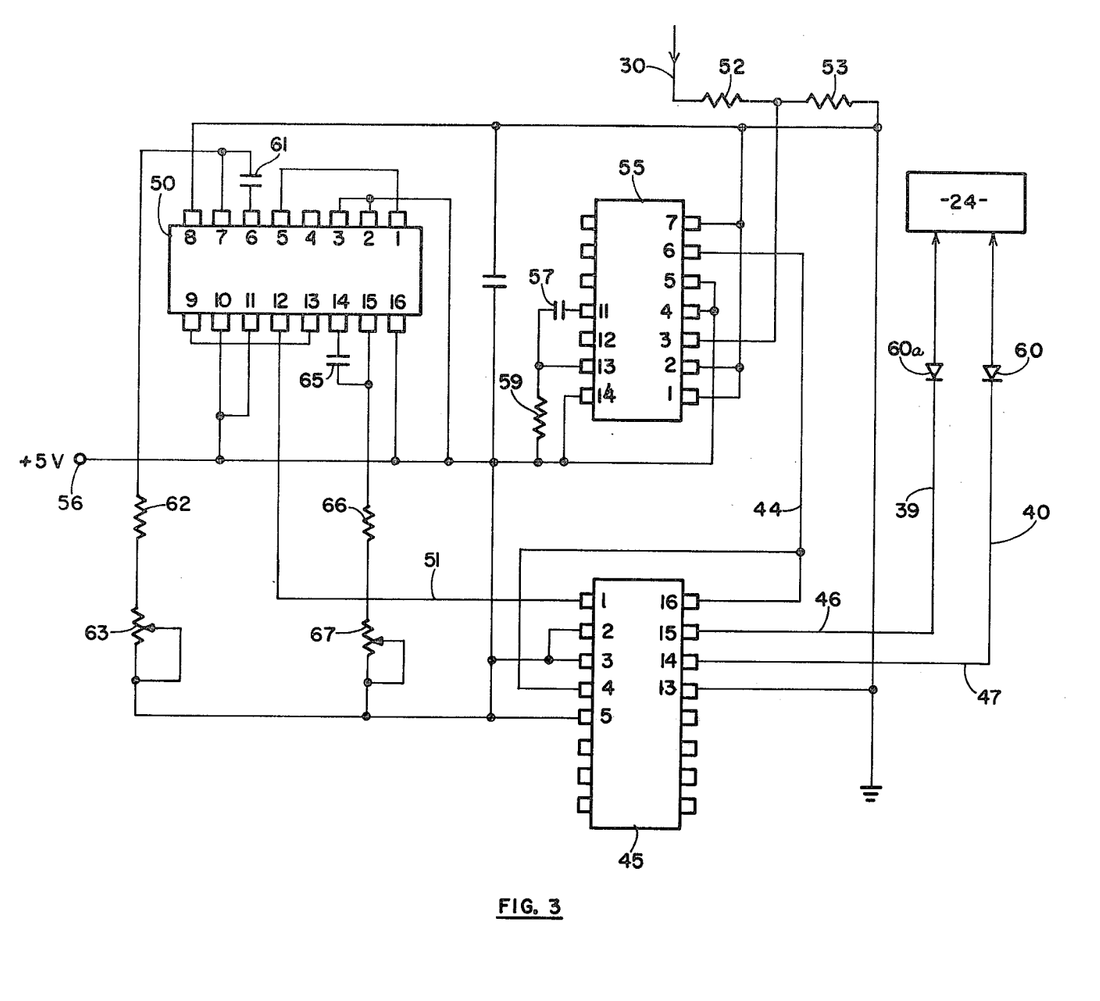
FIG. 3 is an electrical schematic diagram showing one complete embodiment of diversity switch not requiring a manual antenna selector and its attendant connecting logic, with the major active components of the diversity switch illustrated as well-known integrated circuits with their external terminals connected as taught in this invention.
Figure 4:
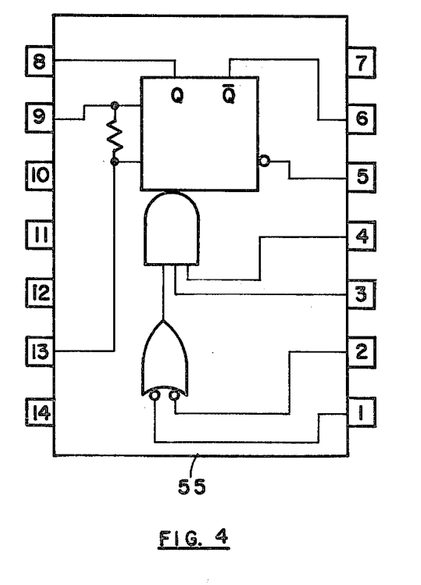
FIG. 4 is a representation of the internals of a monostable multivibrator I.C. assembly acting as the flip-flop control means of FIG. 2, showing explanatory internal connections of the terminals.

FIG. 3 shows the detailed circuit of one example of the diversity switch 31 in a system not requiring or having a selector switch. Here, the blanking pulse line 30 is connected to one end of two series voltage-divider resistors 52 and 53. The junction of these resistors is connected to an input terminal 3 of a monostable multivibrator 55, which may be a commercial retriggerable monostable multivibrator (with clear), for example, as further shown in FIG. 4 Monostable multivibrator 55 is a preferred example of the flip-flop control means 42. Terminals 1, 2 and ground terminal 7 of multivibrator 55 are connected to circuit ground. Terminals 4, 5 and $V_{cc}$ terminal 14 are connected to a positive voltage supply point 56. A $C_{ext}$ terminal 11 of multivibrator 55 is connected through a timing capacitor 57 and then through a timing resistor 59 to the voltage supply point 56. Terminal 13 of the multivibrator is connected to the junction of the timing capacitor 57 and resistor 59. Output terminal 6 is connected to both terminals 4 and 16 of the flip-flop 45 by the flip-flop control line 44.

The monostable multivibrator 55 acts as the flip-flop control means of this invention. As long as blanking pulses continue uninterrupted at the multivibrator input, the multivibrator will remain in its triggered or "on" state and its output to the flip-flop 45 will be low, for example. But when the blanking pulses stop, the multivibrator will time out and return to its "off" state and its output to flip-flop 45 will be high.

Figure 5:
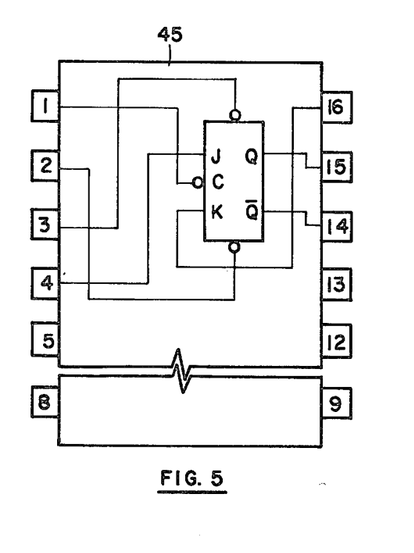
FIG. 5 is a representation of the flip-flop I.C. assembly of FIG. 3, showing explanatory internal connections of the terminals.

The flip-flop 45 may be one-half of a commercial dual J-K masterslave flip-flop with preset and clear, for example, as further shown in FIG. 5. Clock terminal 1 of flip-flop 45 is connected to output terminal 12 of the clock pulse generator 50 by clock pulse line 51. Terminals 2, 3 and $V_{cc}$ terminal 5 are connected to the voltage supply point 56. Ground terminal 13 is connected to ground. Complementary output terminals 14 and 15 of flip-flop 45 are connected by the $\bar{Q}$ and Q lines 47 and 46, respectively, directly to the antenna selector output leads 40 and 39, respectively, and then through two respective protective diodes 60 and 60a (if desired) to the antenna switch 24. This is assuming a positive voltage supply in the switch 24. Depending upon the input requirements of antenna switch 24, suitable amplifiers could of course be provided in the leads to this switch.

Figure 6:
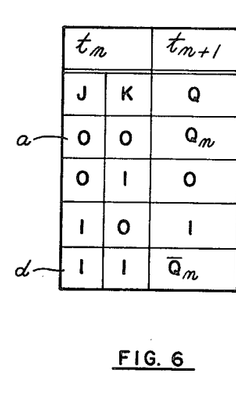
FIG. 6 is a truth table of the flip-flop of FIG. 5 for use in explaining its operation.

FIG. 6 shows the specific mode of operation of the flip-flop 45 in FIG. 5, for inputs to the J and K points and outputs from Q, where $t_n$ = bit time before clock pulse and $t_{n+1}$ = bit time after clock pulse. It will be seen that only lines a and d of the table are actually used in this circuit embodiment, since inputs J and K (terminals 4 and 16) are connected in common to flip-flop control line 44. Thus, whenever the flip-flop control signal or potential on line 44 is low, the flip-flop remains in the same state it was in when the potential on control line 44 went low, regardless of clock pulses; and whenever the flip-flop control potential on line 44 is high, the flip-flop reverses state with each following clock pulse after the potential on line 44 went high.

Figure 7:
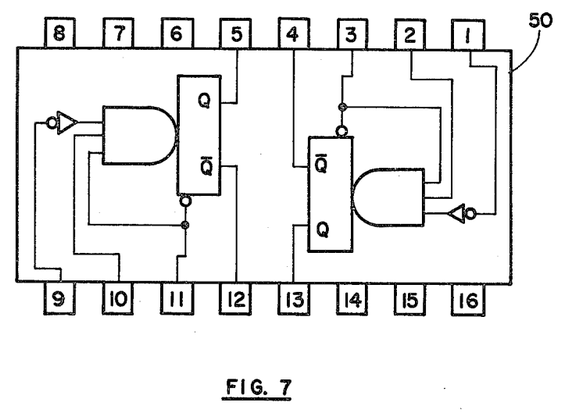
FIG. 7 is a representation of the I.C. assembly acting as a clock pulse generator, showing internal connections of the terminals.

The clock pulse generator 50 may be a commercial dual retriggerable monostable multivibrator with clear, for example, as further shown in FIG. 7. Terminal 1 of pulse generator 50 is connected to terminal 5 thereof, and terminal 9 is connected to terminal 13, so that each internal multivibrator triggers the other to produce a continuous pulse train which is derived from terminal 12 and delivered by the clock pulse line 51 to the clock terminal 1 of the flip-flop 45.

Pulse generator terminals 2, 3, 10, 11 and $V_{cc}$ terminal 16 are connected to the voltage supply point 56. Terminal 4 is unused. One $C_{ext}$ terminal 6 is connected through a first external capacitor 61 to the associated $R_{ext}$ terminal 7. The latter terminal 7 is further connected through a first fixed and variable resistor 62 and 63, respectively, in series to the voltage supply point 56. The ground terminal 8 is grounded. The other $C_{ext}$ terminal 14 is connected through a second external capacitor 65 to the associated other $R_{ext}$ terminal 15. Latter terminal 15 is further connected through a second fixed and variable resistor 66 and 67, respectively, in series to the voltage supply point 56. The external resistors and capacitors govern the clock pulse width and frequency, while the variable resistors 63 and 67 make the pulse rate adjustable as desired.

Figure 8:
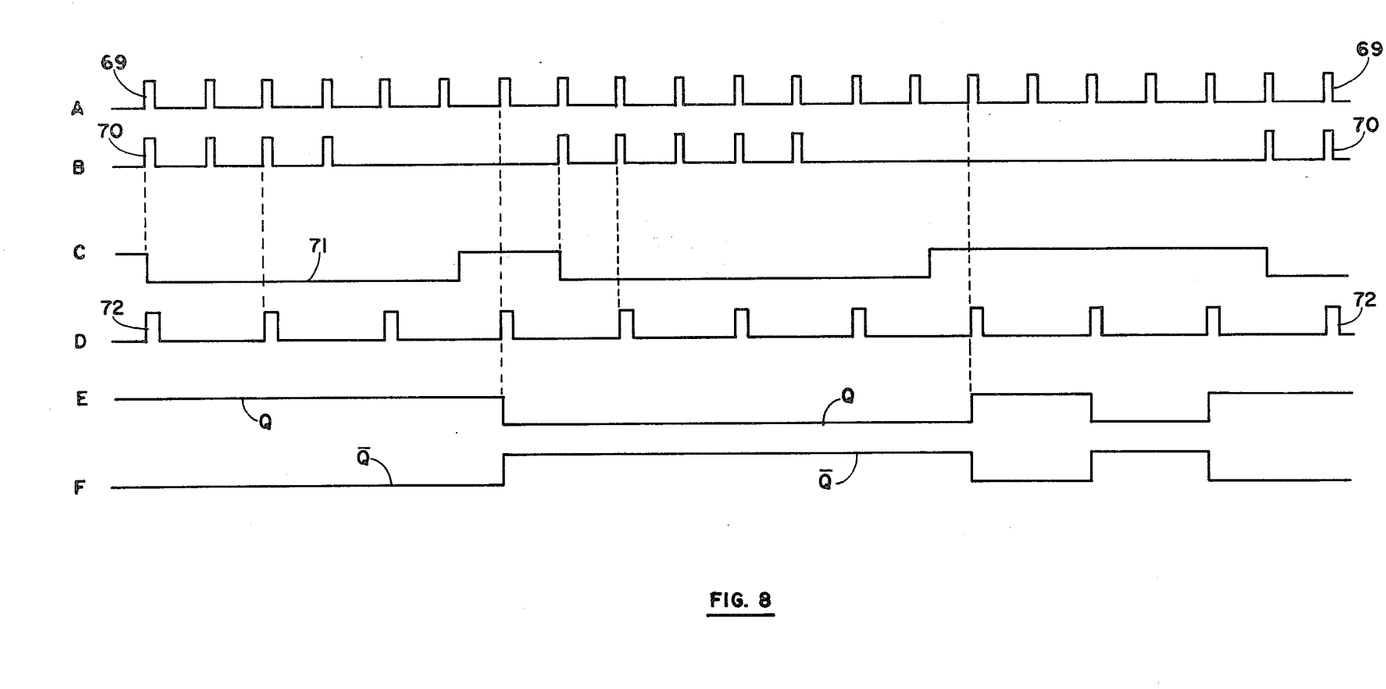
FIG. 8 is a timing diagram showing the various typical significant waveforms produced during a sample operation of the present diversity switch.

Reference is now made to FIG. 8 to clarify the operation of this invention. Line A of FIG. 8 shows pulses 69 transmitted from the interrogating radar 29 with respect to time. These pulses may be repeated at a frequency of 400 per second for example. Assuming a ground radar 29 having a rotating beam, only a certain number of transmitted pulses 69 per sweep of the beam can be received by the present IFF system 20 in actual practice. Line B of FIG. 8 illustrates blanking pulses 70 generated by IFF system 20 for each transmitted pulse 69 of a minimum magnitude actually received from either one of the two antennas 25 and 26. A blanking pulse 70 is generated by the IFF each time it automatically sends a reply to the interrogating radar 29. No simulation of actual blanking pulse pattern is intended — the blanking pulses 70 that are shown represent only an example to demonstrate diversity switch action. Usually the antennas 25 and 26 will be mounted at substantially opposite locations on the vehicle (aircraft) 21, such as at the lower front and upper rear for example, so that at least one antenna is able to receive as many transmitted pulses 69 as possible when within operating range, regardless of the relative direction of the ground radar 29 from the moving vehicle 21.

Line C of FIG. 8 shows a flip-flop control signal 71, which is the binary state of the flip-flop control line 44 at the output terminal 6 of multivibrator 55. It will be seen that each time a blanking pulse 70 occurs at input terminal 3 of multivibrator 55, the output (flip-flop control signal 71) will go low or remain low for at least two more blanking pulse periods; but when at least two successive blanking pulses 70 are missing, the multivibrator 55 then returns to its monostable state in which its output is high. in other words, the "on" time of the multivibrator for this particular situation is designed to be just slightly longer than two periods of the blanking pulses which trigger the multivibrator 55. The multivibrator "on" time can be changed to obtain a different desired delay in antenna switching after loss of signal by substitution of different valued timing capacitor 57 and resistor 59 in FIG. 3.

Line D of FIG. 8 shows the constant rate of clock pulses 72 which are fed to the flip-flop 45 from the clock pulse generator 50. The clock pulse rate governs the desired antenna switching rate when no blanking pulses are present. In this example, such rate is once for each two radar transmitted pulses 69.

Lines E and F of FIG. 8 represent the complementary output signals Q and $\bar{Q}$ of flip-flop 45 on the Q line 46 and $\bar{Q}$ line 47, respectively, in FIG. 3. As described previously, it is seen from this waveform diagram that flip-flop 45 changes state with each clock pulse occurrence only when the flip-flop control signal 71 is high, and remains in its instantaneous state (either one or the other) all the while the flip-flop control signal 71 is low. Also, when Q is low (grounded) and $\bar{Q}$ is high, the antenna switch 24 is energized to the position connecting the first antenna 25, for example, to the antenna output line 27 and hence to the IFF set 20, and when Q is high and $\bar{Q}$ is low (grounded), antenna switch 24 is in its opposite position where the second antenna 26, for example, is connected via antenna output line 27 to the IFF 20.

It is thus seen that the antenna switching is positively controlled by the blanking pulses 70, which is synonomous with saying that antenna switching stops whenever the IFF system 20 is replying to a received signal from the radar 29.

Figure 9:
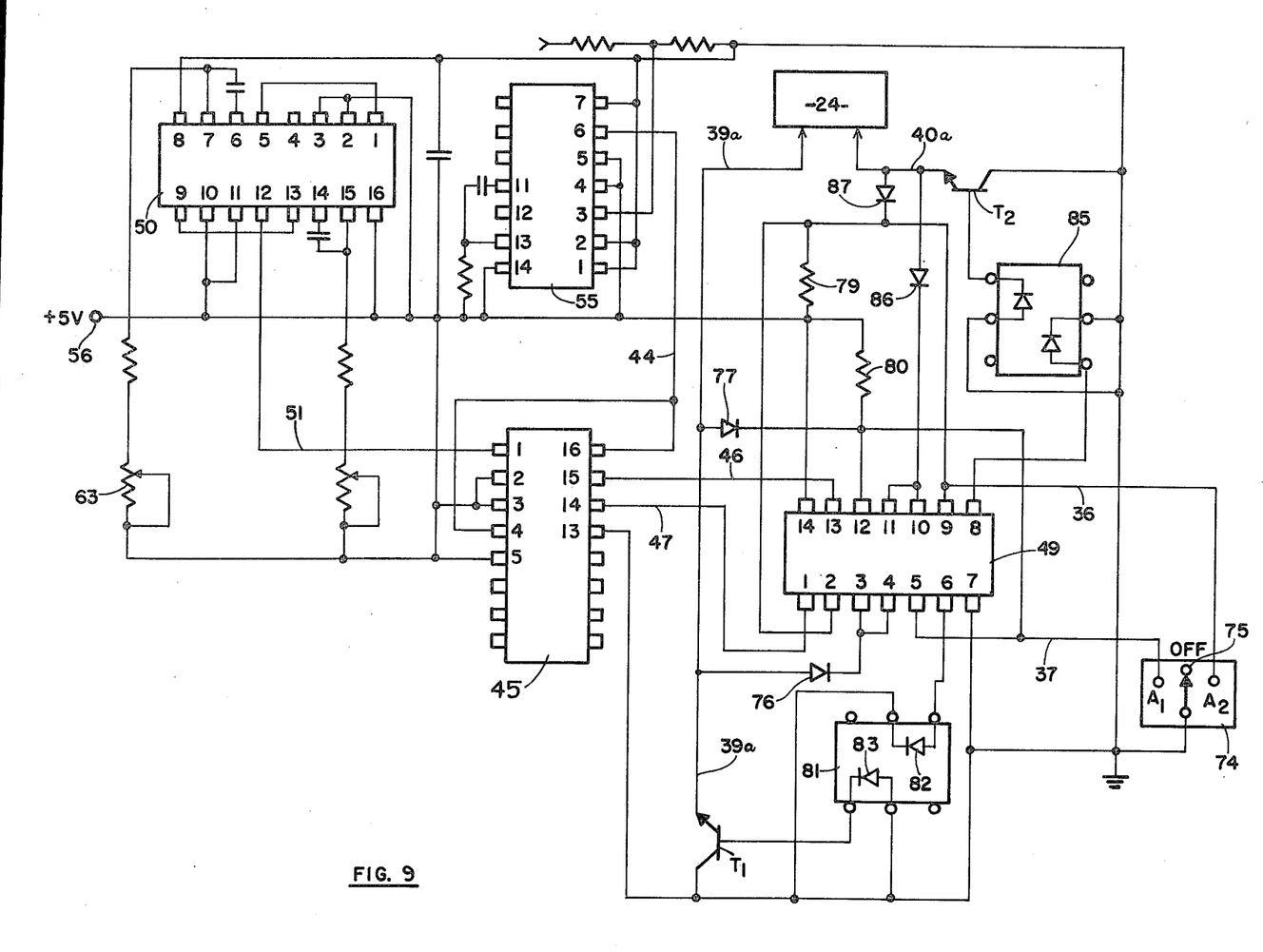
FIG. 9 is an electrical schematic diagram similar to FIG. 3, showing a complete peferred embodiment of diversity switch wherein the system contains a manual antenna selector to override normal automatic switching operation.

FIG. 9 shows essentially the same diversity switch system as FIG. 3 with the addition of a three-position manual antenna selector switch 74, together with the accompanying logic circuit 49 and the like. Manual selector switch 74 is an override switch located convenient to the IFF operator and having an off position 75, first antenna position $A_1$ and second antenna position $A_2$. The single pole of manual selector switch 74 is grounded.

Figure 10:
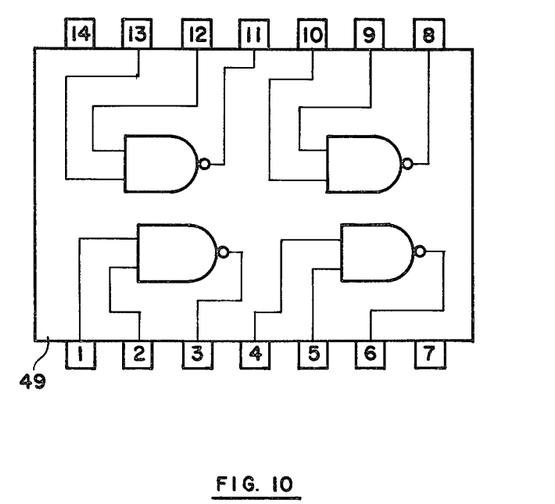
FIG. 10 is a representation of the I.C. assembly acting as the logic section of FIG. 9, showing internal connections of the terminals.

In the preferred system of FIG. 9, the Q and $\bar{Q}$ lines 46 and 47 from flip-flop 45 do not connect directly to the input circuit of the antenna switch 24, but are connected to input terminals 13 and 1, respectively, of the logic circuit 49. The latter may be a commercial quadruple two-input positive NAND gate, for example, as further shown in FIG. 10. Terminals 2 and 9 of logic circuit 49 are connected to the second antenna position $A_2$ of manual selector switch 74 and through a first loading resistor 79 to the positive voltage supply point 56. Logic circuit terminals 3 and 4 are connected together, and terminals 10 and 11 are also connected together. Logic circuit terminals 5 and 12 are connected to manual selector switch first antenna position $A_1$ and through a second loading resistor 80 to voltage supply point 56.

One output terminal 6 of logic circuit 49 is connected to a first conventional LED unit 81 having an input isolation diode 82 and an output isolation diode 83. When input diode 82 conducts, it acts as an infra-red transducer to cause output diode 83 to conduct. Otherwise, output diode 83 is non-conductive. The output diode 83 is connected in the base circuit of a first driver transistor $T_1$ whose collector is grounded and whose emitter is connected to the first antenna selector output lead 39a to antenna switch 24 to select the first antenna 25 when transistor $T_1$ is made to conduct, i.e., its emitter is effectively grounded. The output circuit of transistor $T_1$ is completed in the antenna switch 24 where the power supply connection for the transistor is located also. Conduction of output diode 83 causes conduction of transistor $T_1$ which is connected in the emitter follower configuration. A first steering diode 76 has its anode connected to the emitter of transistor $T_1$ and its cathode to terminals 3 and 4 of logic circuit 49. A second steering diode 77 has its anode also connected to the emitter of transistor $T_1$ and its cathode to position $A_1$ of the manual selector switch 74. These diodes will be referred to later.

It will be seen from this description and FIG. 9 that LED unit 81 merely functions as a polarity inverter for this particular circuit configuration.

Returning to the logic circuit 49, ground terminal 7 is grounded and $V_{cc}$ terminal 14 is connected to the voltage supply point 56. The other logic circuit output terminal 8 is connected to a second LED unit 85 identical to first LED unit 81. The output of second LED unit 85 is connected to a second driver transistor $T_2$ in like manner as first LED unit 81 and transistor $T_1$. The emitter of second transistor $T_2$ is connected to the second antenna selector output lead 40a to antenna switch 24 so that the second antenna 26 is selected when transistor $T_2$ is made to conduct, i.e., its emitter is effectively grounded.

A third steering diode 86 has its anode connected to the emitter of transistor $T_2$ and its cathode to terminals 10 and 11 of logic circuit 49. A fourth steering diode 87 has its anode also connected to the emitter of transistor $T_2$ and its cathode to position $A_2$ of the manual selector switch 74. These diodes, along with the other steering diodes 76 and 77, operate in conjunction with transistors $T_1$ and $T_2$ to render the system of FIG. 9 operative with either a positive or negative power supply (with respect to ground) used in the antenna switch 24. With either polarity, it is the grounding of the antenna switch input control line (lead 39a or 40a) which performs the antenna selection function. When the antenna switch 24 is the type using a positive source voltage, it is the steering diodes 76 and 77 or 86 and 87 which provide the path for ground selected by the logic circuit 49 or manual antenna selector switch 74. At the same time, this positive source condition has transistors $T_1$ and $T_2$ reverse biased (non-conducting) and they do not affect the operation. But when antenna switch 24 is using a negative source voltage, the steering diodes 76, 77, 86 and 87 are all reverse biased, and it is the transistors ($T_1$ or $T_2$) which are selectively made conductive by logic 49 or manual selector switch 74 to provide the proper path to ground for the foregoing antenna selections.

Therefore, it can be seen that when manual antenna selector switch 74 is "off", control of antenna selection always comes from the output of the flip-flop 45, but the manual selector switch 74 is controlling whenever moved to either of its operating positions. The logic circuit 49 (which technically includes the LED units 81 and 85 and steering diodes 76, 77, 86 and 87) will not permit both transistors $T_1$ and $T_2$ to be conducting simultaneously or both antennas 25 and 26 to be selected simultaneously. If a malfunction occurs in the diversity switch sections ahead of the logic circuit 49, either antenna can be selected as desired, by using the manual selector switch 74.

It is thus seen that the present diversity switch is easily added to an IFF installation not having such a provision. Many modifications can be made to the presently disclosed system without departing from the principal concepts thereof. Other flip-flop control means than the multivibrator 55 can be used. The term "flip-flop" as used herein is intended to include any type of multivibrator which is controllable between a free-running (astable) condition and a bistable condition. Other selector means rather than a J-K flip-flop with a clock pulse generator might be used, but the latter is believed better and simpler than other varieties of circuits. Also, the present system is obviously adaptable to whatever different configuration or type of an antenna switch 24 is to be used.

Further, the logic means as described and claimed hereafter broadly includes the LED units 81 and 85 and the driver transistors $T_1$ and $T_2$.

Moreover, it may be desired to have three or more antennas that are connectable in sequence rather than only the two, by adding a third antenna 26a in a different location as indicated by dash lines in FIG. 1. In this event, the flip-flop 45 of the present specification would be changed to a three-output device to control the antenna switching sequence, and the logic could be expanded as necessary.

While in order to comply with the statute, the invention has been described in language more or less specific as to structural features, it is to be understood that the invention is not limited to the specific features shown, but that the means and construction herein disclosed comprise the preferred mode of putting the invention into effect, and the invention is therefore claimed in any of its forms of modifications within the legitimate and valid scope of the appended claims.

I claim:

1. In an IFF system or the like having at least two antennas, an antenna switch with two control inputs for switching the IFF system from one antenna to the other and means producing a blanking pulse for each received interrogating pulse of a minimum magnitude from an external radar; an antenna diversity switch comprising:
    a. a flip-flop controllable from a free-running condition to a bistable condition;
    b. means operatively connecting the two complementary outputs of said flip-flop to the two control inputs, respectively, of said antenna switch;
    c. flip-flop control means;
    d. means conducting the blanking pulses to said flip-flop control means;
    e. said flip-flop control means having a first magnitude output signal in response to the absence of blanking pulses thereto, and a second magnitude output signal in response to the presence of blanking pulses thereto; and
    f. means conducting said output signals from said flip-flop control means to said flip-flop in proper polarity to make said flip-flop free-running in response to said first magnitude signal and stopped in its instantaneous bistable state in response to said second magnitude signal.

2. Apparatus in accordance with claim 1 wherein said flip-flop control means comprises a monostable multivibrator having said blanking pulses connected at its trigger input, and its output connected to said flip-flop, the "on" period of said multivibrator being longer than one blanking pulse period, whereby antenna switching will not be resumed in the absence of only one blanking pulse at a time.

3. Apparatus in accordance in claim 1 wherein said flip-flop comprises a J-K type with a clock trigger input for triggering said flip-flop only when a clock pulse occurs at said clock input and only in accordance with state information then present at the J and K inputs, and wherein said means conducting said output signals from said flip-flop control means to said flip-flop includes a common connection to both the J and K inputs.

4. Apparatus in accordance with claim 3 including a clock pulse generator having its output connected to the clock input of said J-K flip-flop.

5. Apparatus in accordance with claim 4 wherein the clock pulse frequency is approximately one-half the interrogating pulse rate from the radar with which said IFF system is intended to operate.

6. In an IFF system or the like having two or more antennas, an antenna switch with two control inputs for switching the IFF system from one antenna to a second, and a manual antenna selector switch having respective first antenna, second antenna, and "off" positions; an automatic antenna diversity switch comprising:
   a. logic circuit means having two output points, means connecting said two output points respectively to the two control inputs of said antenna switch;
   b. said logic circuit means having first input points connected respectively to a contact at said first antenna position and a contact at said second antenna position of said manual antenna selector switch;
   c. a flip-flop controllable between a free-running condition and a bistable condition;
   d. said logic circuit having additional input points connected respectively to the two complementary outputs of said flip-flop;
   e. flip-flop control means;
   f. means producing a reply pulse for each interrogating pulse of a minimum magnitude received by the IFF system from an external radar or radio system;
   g. means conducting said reply pulses to said flip-flop control means;
   h. said flip-flop control means having a first magnitude binary output potential in response to the absence of reply pulses thereto, and a second magnitude binary output potential in response to the presence of reply pulses thereto; and
   i. means conducting said output potentials from said flip-flop control means to said flip-flop in proper relative magnitude to make said flip-flop free-running in response to said first magnitude potential and stopped in its instantaneous bistable condition in response to said second magnitude potential.

7. Apparatus in accordance with claim 6 wherein said two output points of said logic circuit are in a first complementary state to thereby select said one antenna whenever said manual antenna selector switch is in its said first antenna position, and said two output points are in the opposite complementary state to select said second antenna whenever said manual selector switch is in its said second antenna position, regardless of the condition of said flip-flop.

8. Apparatus in accordance with claim 6 wherein said logic circuit means includes driver amplifier means in said connecting means to said two control inputs of said antenna switch.

9. In an IFF system installation or the like having a transponder, at least two antennas, an antenna switch with two control inputs for switching the IFF system from one antenna to the other, means producing a blanking pulse for each received interrogating pulse of minimum magnitude from an external source, and a manual antenna selector switch having two separate output leads for manual selection of either of said antennas; the improvement comprising:
   a. an antenna diversity switch for constant automatic switching between said antennas in the absence of a received signal of minimum strength by the IFF system from said external source and for constant connection to only one antenna in the presence of such received signals on that one antenna;
   b. means for conducting said blanking pulses to said diversity switch;
   c. the wiring between said transponder and said antenna switch including a tee fitting;
   d. said two output leads from said manual selector switch running through said tee to said diversity switch; and including
   e. two diversity switch output leads running through said tee to said antenna switch control inputs.

* * * * *